(12) United States Patent
Ishii et al.

(10) Patent No.: US 10,060,430 B2
(45) Date of Patent: Aug. 28, 2018

(54) INTERNAL GEAR PUMP

(71) Applicant: NTN CORPORATION, Osaka (JP)

(72) Inventors: Takuya Ishii, Mie (JP); Hajime Asada, Mie (JP)

(73) Assignee: NTN CORPORATION, Osaka (JP)

( * ) Notice: Subject to any disclaimer, the term of this patent is extended or adjusted under 35 U.S.C. 154(b) by 38 days.

(21) Appl. No.: 15/104,188

(22) PCT Filed: Dec. 10, 2014

(86) PCT No.: PCT/JP2014/082615
§ 371 (c)(1),
(2) Date: Jun. 13, 2016

(87) PCT Pub. No.: WO2015/087891
PCT Pub. Date: Jun. 18, 2015

(65) Prior Publication Data
US 2016/0327036 A1 Nov. 10, 2016

(30) Foreign Application Priority Data

Dec. 13, 2013 (JP) ................... 2013-258503

(51) Int. Cl.
*F01C 1/10* (2006.01)
*F03C 2/00* (2006.01)
(Continued)

(52) U.S. Cl.
CPC ............ *F04C 2/102* (2013.01); *F04C 11/005* (2013.01); *F04C 15/0088* (2013.01);
(Continued)

(58) Field of Classification Search
CPC .......... F04C 2/102; F04C 2/084; F04C 2/086; F04C 18/0215; F04C 29/025;
(Continued)

(56) References Cited

U.S. PATENT DOCUMENTS 6,089,843 A * 7/2000 Kondoh .................... B22F 7/08
418/171
2001/0026767 A1* 10/2001 Takagi .................. F04C 11/001
418/171
(Continued)

FOREIGN PATENT DOCUMENTS

CN        1616825 A    5/2005
CN      201225279 Y    4/2009
(Continued)

OTHER PUBLICATIONS

International Search Report for PCT/JP2014/082615 dated Mar. 3, 2015.
(Continued)

*Primary Examiner* — Theresa Trieu
(74) *Attorney, Agent, or Firm* — Hedman & Costigan, P.C.; James V. Costigan; Kathleen A. Costigan

(57) ABSTRACT

An internal gear pump integrally provided with a plain bearing requiring fewer machining steps, allowing inexpensive manufacture, and offering a highly stable seizing property. The internal gear pump has a trochoid (4), in which an inner rotor (3) having a plurality of outer teeth is eccentrically and rotatably accommodated in an outer rotor (2) having a plurality of inner teeth, the outer teeth meshing with the inner teeth, and in which a suction-side chamber for suctioning liquid and a discharge-side chamber for discharging the liquid that has been suctioned into the suction-side chamber are formed between the inner teeth and outer teeth; a drive shaft (9) fixed to the inner rotor (3); a casing (5) in which is formed a recess (5a) for accommodating the trochoid (4); and a cover (6) for closing off the recess (5a) of the casing (5).

4 Claims, 12 Drawing Sheets

(51) Int. Cl.

| | | |
|---|---|---|
| *F03C 4/00* | (2006.01) | |
| *F04C 2/00* | (2006.01) | |
| *F04C 2/10* | (2006.01) | |
| *F16C 17/10* | (2006.01) | |
| *F16C 33/20* | (2006.01) | |
| *F04C 11/00* | (2006.01) | |
| *F04C 15/00* | (2006.01) | |
| *F04C 18/02* | (2006.01) | |
| *F04C 29/02* | (2006.01) | |
| *F16C 33/10* | (2006.01) | |

(52) U.S. Cl.
CPC ........ *F04C 18/0215* (2013.01); *F04C 29/025* (2013.01); *F16C 17/107* (2013.01); *F16C 33/205* (2013.01); *F04C 2230/21* (2013.01); *F04C 2230/60* (2013.01); *F04C 2240/20* (2013.01); *F04C 2240/50* (2013.01); *F04C 2240/60* (2013.01); *F05C 2225/08* (2013.01); *F16C 33/1065* (2013.01); *F16C 2206/06* (2013.01); *F16C 2208/02* (2013.01); *F16C 2208/22* (2013.01); *F16C 2208/32* (2013.01); *F16C 2208/36* (2013.01); *F16C 2220/04* (2013.01); *F16C 2360/42* (2013.01)

(58) Field of Classification Search
CPC .............. F04C 2230/60; F04C 2240/50; F04C 2240/60; F04C 2240/20; F16C 33/205; F16C 2208/00; F16C 2208/22; F16C 2208/32; F16C 2208/36; F05C 2225/04; F05C 2225/08
USPC ........... 418/166, 171, 152, 178–179, 88, 94, 418/55.1–55.6, 57, 1
See application file for complete search history.

(56) References Cited

U.S. PATENT DOCUMENTS

| | | |
|---|---|---|
| 2005/0042124 A1 | 2/2005 | Miyagi |
| 2006/0120896 A1 | 6/2006 | Morita |
| 2010/0183454 A1 | 7/2010 | Lübke et al. |

FOREIGN PATENT DOCUMENTS

| | | | |
|---|---|---|---|
| CN | 201902323 U | 7/2011 | |
| DE | 102005052346 A1 | 6/2006 | |
| JP | 02045675 A * | 2/1990 | ......... F04C 18/0215 |
| JP | 2611371 B | 5/1997 | |
| JP | 10-037947 A | 2/1998 | |
| JP | 2006-118442 A | 5/2006 | |
| JP | 2006-152914 A | 6/2006 | |
| JP | 2006-177239 A | 7/2006 | |
| JP | 4215160 B | 1/2009 | |
| JP | 4726116 B | 7/2011 | |
| JP | 2013-002517 A | 1/2013 | |
| JP | 2013-145026 A | 7/2013 | |
| WO | 2012/173223 A1 | 12/2012 | |

OTHER PUBLICATIONS

Supplementary European Search Report dated Jul. 18, 2017.
English Abstract for JP 10-037947 A dated Feb. 13, 1998.
English Abstract for CN 1616825 A dated May 18, 2005.
English Abstract for CN 201225279 Y dated Apr. 22, 2009.
English Abstract for CN 201902323 U dated Jul. 20, 2011.

* cited by examiner (a)

(b)

INTERNAL GEAR PUMP

TECHNICAL FIELD

The present invention relates to an internal gear pump (trochoid pump) for pumping liquids, e.g., oil, water, and chemicals.

TECHNICAL BACKGROUND

In an internal gear pump (trochoid pump), an inner rotor and an outer rotor having a trochoid tooth profile are hermetically sealed in a casing. The outer rotor and inner rotor, which is fixed to a drive shaft, rotate along with the rotation of the drive shaft and act to suction and discharge liquids. Examples of this type of pump are submitted, e.g., in patent documents 1 to 3.

An example of a conventional internal gear pump is shown in FIGS. 11 and 12. FIG. 11 is a perspective view of the assembly of a conventional internal gear pump. FIG. 12(a) is a sectional view of the internal gear pump of FIG. 11, and FIG. 12(b) is a sectional view of an internal gear pump having a different configuration. As shown in FIG. 11, the pump 21 mainly comprises a trochoid 24 in which an inner rotor 23 having a plurality of outer teeth is accommodated inside an annular outer rotor 22 having a plurality of inner teeth. The trochoid 24 is rotatably accommodated in a circular trochoid-accommodating recess 25a formed in a flanged, cylindrical casing 25. A cover 26 for closing off the trochoid-accommodating recess 25a is fixed on the casing 25. As shown in FIG. 12(a), the casing 25 and the cover 26 are securely fixed by bolts 30 on a fixing plate 28 of the device body. The mating faces of the casing 25 and the cover 26 are machined faces that are face-sealed.

The trochoid 24 is configured so that the outer teeth of the inner rotor 23 mesh with the inner teeth of the outer rotor 22 and the inner rotor 23 is rotatably accommodated inside the outer rotor 22 in an eccentric state. Suction-side and discharge-side chambers are formed in accordance with the rotating direction of the trochoid 24 between partitioning points where the rotors are in contact with each other. A drive shaft 31 (not shown in FIG. 11) that is made to rotate by a drive source such as a motor (not shown) passes through, and is fixed, in the axial center of the inner rotor 23. A bearing 32 for supporting the drive shaft 31 is press-fitted into the cover 26. When the drive shaft 31 rotates and the inner rotor 23 rotates, the outer rotor 22 rotates in turn in the same direction as a result of the outer teeth of the inner rotor 23 meshing with the inner teeth of the outer rotor 22. Liquid is suctioned from an inlet into the suction-side chamber, which increases in volume and drops to negative pressure, by the rotation of the rotors. This suction-side chamber undergoes a decrease in volume and an increase in internal pressure due to rotation of the trochoid 24 and is converted to a discharge-side chamber. The suctioned liquid is then discharged to an outlet.

The bearing 32 can be a roller bearing, or a plain bearing such as a metal bush (an alloy of copper, tin, lead, or the like) or a bush wrapped with a polytetrafluoroethylene (abbreviated as PTFE below) resin. Of these examples, an inexpensive plain bearing is often used. When a plain bearing is to be press-fitted into the cover 26, a bearing press-fitting part of the cover 26 is finished by machining before the press-fitting. Furthermore, the inside diameter of the plain bearing is machined after press-fitting in order to manage the clearance to the drive shaft 31.

A liquid-suctioning nozzle 27 that extends from the casing 25 is provided as necessary on the inlet that communicates with the suction-side chamber (FIG. 12(b)). A metallic or resinous mesh filter 29 for removing foreign matter in the suctioned liquid is installed at a desired location in the inlet pathway leading to the suction-side chamber, including the nozzle 27. The mesh filter 29 is spot-welded or physically fixed with a C-ring, etc. The mesh filter 29 or the liquid-suctioning nozzle 27 is installed with a rubber packing, interposed to ensure sealing performance.

PRIOR ARTS LIST

Patent Documents

Patent Document 1: Japanese Patent Publication No. 4215160

Patent Document 2: Japanese Patent Publication No. 4726116

Patent Document 3: Japanese Patent Publication No. 2611371

SUMMARY OF THE INVENTION

Problems to be Solved by the Invention

Either a cast part that is formed from cast iron or aluminum that has been molded by aluminum die-casting or another method, or a sintered metal article, is used as the cover 26 into which the bearing 32 is press-fitted. The fastening margin must be managed during the press-fitting so that the bearing 32 does not fall out during use. It is difficult to use the press-fitted part of the cover without machining because the cast part formed from cast iron or aluminum has low dimensional precision.

When the fastening margin is increased in order to omit processing, the cover or bearing deforms because the press-fitting force increases, sometimes causing a decrease in functionality. There are also cases in which the bearing or cover tears during press-fitting, and chips produced therefrom cause adverse events such as seizing of sliding parts. For example, when chips get caught in the sliding parts of a scroll compressor (in the tip seal, scroll member, thrust bearing, or radial bearing), abrasion of the members is accelerated, which can reduce durability, increase power consumption, and degrade refrigeration performance. In particular, with scroll-type compressors that have carbon dioxide gas as a refrigerant, the discharge pressure is 8 MPa and above, and as great as 10 MPa and above. Consequently, even small amounts of chips (abrasion powder) can easily cause abrasion of tip seals and/or scroll members that are made of aluminum alloy.

The cover 26 has insufficient dimensional precision even if it is a sintered metal article, and machining therefore cannot be omitted. Because sintered metal is brittle, there is a risk that the cover will crack when the fastening margin is increased. Thus, machining is necessary and therefore increases cost.

The bearing 32 is used while being lubricated by a pumped liquid, e.g., oil, water, or chemical, but depending on the design environment and external factors (for example, when the pumped liquid is temporarily depleted), the bearing could sometimes be used with little to no lubrication. With compressors of the type used, e.g., in air conditioners, there are cases in which the compressor is restarted yearly after 6-12 months of inactivity. When the bearing is used with little to no lubrication, the metal bush seizes up prematurely. A PTFE resin-wrapped bush does not seize up prematurely, being configured with a copper-tin alloy powder layer formed on a steel plate that serves as back plate and a PTFE resin layer (several tens of microns in thickness) formed on the powder layer, and the PTFE resin layer on the outermost layer being lubricated. However, the inside diameter of a PTFE resin-wrapped bush is machined, and the copper-tin alloy powder layer is therefore partially exposed. Due to the dimensions during inside diameter machining, as well as nonuniformity in the copper-tin alloy powder layer and the PTFE resin layer of a PTFE resin-wrapped bush, the exposed percentage of the copper-tin alloy powder layer changes and nonuniformity arises in the seizing property. In some cases, there are areas in the bearing where the exposed percentage is extremely high as a result of core misalignment between machining of the press-fitted part of the bearing before press-fitting and inside-diameter machining of the plain bearing after press-fitting. The problems described above occur because a PTFE resin-wrapped bush is not made of only one single material.

The present invention was contrived to address such problems, it being an object of the invention to provide an internal gear pump integrally provided with a plain bearing that has a highly stable seizing property, and enables manufacturing costs to be reduced by eliminating machining steps.

Means to Solve the Problems

The internal gear pump of the present invention is an internal gear pump that has a trochoid in which an inner rotor having a plurality of outer teeth is eccentrically and rotatably accommodated in an outer rotor having a plurality of inner teeth, the outer teeth meshing with the inner teeth, and in which a suction-side chamber for suctioning liquid and a discharge-side chamber for discharging the liquid suctioned into the suction-side chamber are formed between the inner teeth and the outer teeth; said internal gear pump characterized by comprising a drive shaft fixed to the inner rotor, a casing in which a recess for accommodating the trochoid is formed, and a cover for closing off the recess of the casing, one or both members selected from the cover and the casing having a plain bearing part for rotatably supporting the drive shaft, and the plain bearing part being formed on said member by injection-molding a thermoplastic resin composition.

The invention also is characterized in that in the member having the plain bearing part, the area where the plain bearing part is formed is a sintered metal body.

The invention also is characterized in that the plain bearing part has a radial bearing part and a thrust bearing part, the thrust bearing part being positioned on the inside-diameter side of the radial bearing part. The invention also is characterized in that a drive-shaft thrust-supporting face of the thrust bearing part has lubrication grooves that communicate with a through-hole for the drive shaft in said supporting face.

The invention also is characterized in that the thermoplastic resin composition is made by blending carbon fibers and a PTFE resin into a polyether ether ketone (abbreviated as PEEK below) resin.

The invention also is characterized in that the internal gear pump is a pump for supplying the liquid to sliding parts of a scroll compressor.

Advantageous Effects of the Invention

According to the internal gear pump of the present invention, because either one or both members of the casing in which is formed a recess for accommodating the trochoid and the cover for closing off the recess of the casing has a plain bearing part for rotatably supporting the drive shaft, and the plain bearing part is formed on said member by injection-molding a thermoplastic resin composition, there is no need to machine the plain bearing part into the cover or the casing, and the internal gear pump can be manufactured at lower cost than by press-fitting a plain bearing that has been molded separately. The plain bearing part does not have a back plate, a sintered layer, or the like and the plain bearing part is configured from a single material, i.e., the thermoplastic resin composition, and seizing resistance is therefore stably increased.

The area where the plain bearing part is formed is made of a sintered metal body in the member having the plain bearing part, and adhesive force with the injection-molded resin composition is therefore increased by an anchoring effect of the concavities and convexities in the sintered metal surface.

The plain bearing part has a radial bearing part and a thrust bearing part and the thrust bearing part is positioned on the inside-diameter side of the radial bearing part, and the plain bearing part therefore has less torque and less abrasion. The plain bearing part is formed by injection-molding, and the bearing can therefore easily be formed into a shape which receives both radial loads and thrust loads.

A drive-shaft thrust-supporting face of the thrust bearing part has lubrication grooves that communicate with a through-hole for the drive shaft in said supporting face, and oil or the like is therefore readily introduced to said supporting face through the gap between the drive shaft and the bearing part, and the bearing part can be made to have even less torque and less abrasion. Furthermore, the lubrication grooves are formed in a configuration in which the thrust bearing part is positioned on the inside-diameter side of the radial bearing part, and the oil or the like can therefore be prevented from leaking to the exterior.

The thermoplastic resin composition is made by blending carbon fibers and a PTFE resin into a PEEK resin, and a bearing-integrated pump can therefore be obtained which has excellent heat resistance, oil and chemical resistance, creep resistance, load resistance, abrasion resistance, and low friction characteristics, and which also has a long service life with an excellent seizing property.

Inasmuch, the internal gear pump of the present invention is favorably used as a pump for supplying liquids to the sliding parts of scroll-type compressors used in air conditioners.

DESCRIPTION OF THE EMBODIMENTS

Figure 1:
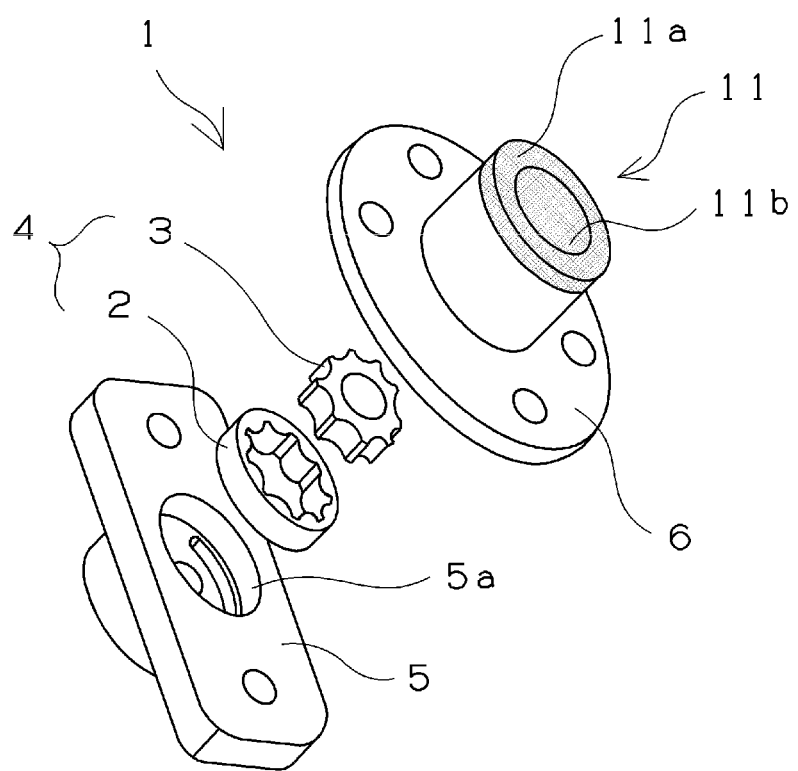
FIG. 1 is an exploded view of an example of the internal gear pump of the present invention.
Figure 2:
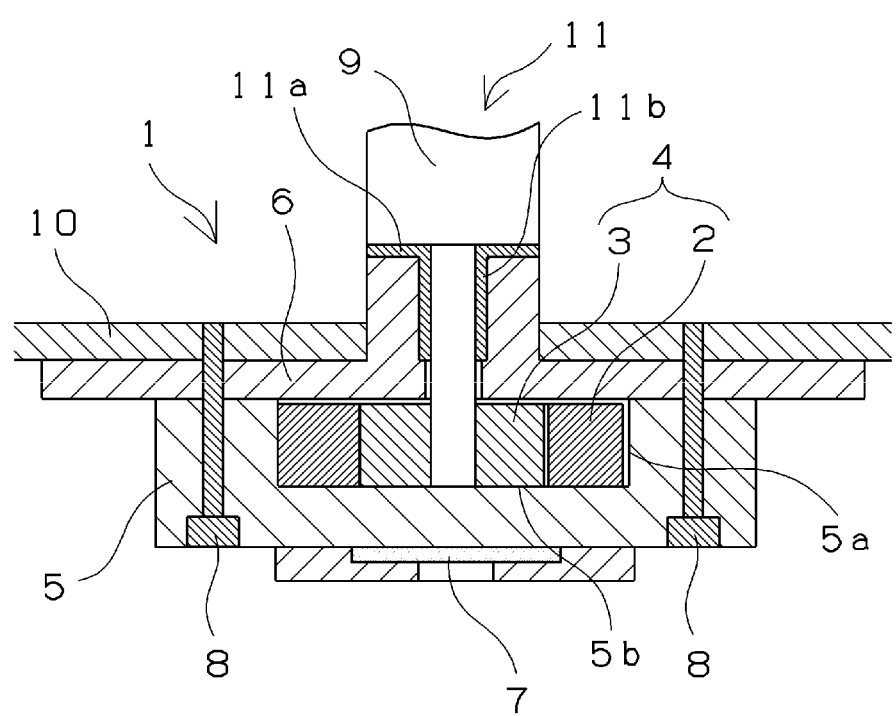
FIG. 2 is an axial sectional view of an example of the internal gear pump of the present invention.
Figure 3:
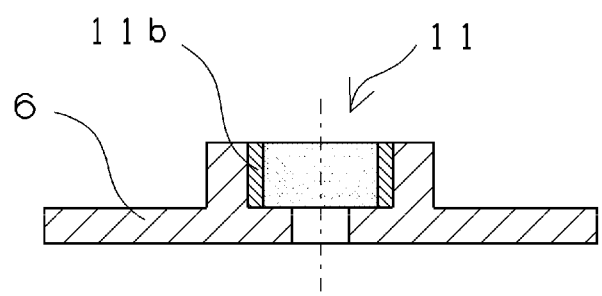
FIG. 3 shows an example of a cover in which a radial bearing part is formed.

An embodiment of the internal gear pump of the present invention is described below with reference to FIGS. 1 and 2. FIG. 1 is an exploded view of the internal gear pump. FIG. 2 is an axial sectional view of the internal gear pump. As shown in FIGS. 1 and 2, the internal gear pump 1 has a trochoid 4 in which an inner rotor 3 is accommodated in an annular outer rotor 2, a casing 5 in which is formed a circular recess (trochoid-accommodating recess) 5a for rotatably accommodating the trochoid 4, and a cover 6 for closing off the trochoid-accommodating recess 5a of the casing 5. The cover 6 is shaped to match the outer shape of the upper face of the casing 5 where the trochoid-accommodating recess 5a opens. As shown in FIG. 2, the casing 5 and cover 6 are securely fixed to the fixing plate 10 of the device body by fixing bolts 8. In addition, there is provided a drive shaft 9 that is fixed coaxially at the center of rotation of the inner rotor 3.

The number of outer teeth of the inner rotor 3 is one less than the number of inner teeth of the outer rotor 2, and the inner rotor 3 is accommodated in an eccentric state inside the outer rotor 2, with the outer teeth in internal contact with the inner teeth and meshing therewith. A suction-side chamber and a discharge-side chamber are formed in accordance with the direction of rotation of the trochoid 4 in between partitioning points where the respective rotors contact each other. An inlet that communicates with the suction-side chamber and an outlet that communicates with the discharge-side chamber are formed in a bottom face 5b of the trochoid-accommodating recess 5a of the casing 5. The inlet that communicates with the suction-side chamber and the outlet that communicates with the discharge-side chamber may be formed in the casing 5, the cover 6, or the drive shaft 9.

The trochoid 4 is caused to rotate by the drive shaft 9 in the internal gear pump 1, whereby liquid is suctioned from the inlet into the suction-side chamber, which increases in volume and drops to negative pressure. This suction-side chamber decreases in volume and increases in internal pressure due to rotation of the trochoid 4 and is converted to a discharge-side chamber. The suctioned liquid is then discharged to the outlet from the discharge-side chamber. The pumping action described above occurs continuously due to the rotation of the trochoid 4, and liquid is continuously pumped. In addition, as the result of a liquid-sealing effect occurring from an increase in the degree to which the respective chambers are hermetically sealed by the suctioned liquid, the pressure differential arising between the respective chambers increases, and a strong pumping action is obtained.

The basic configuration and operation of the internal gear pump of the present invention was described above, but the internal gear pump of the present invention is primarily characterized in that a plain bearing part 11 is formed by injection-molding (insertion-molding) a thermoplastic resin composition on the cover 6 and/or the casing 5.

In the example shown in FIGS. 1 and 2, the drive shaft 9 is rotatably supported by the plain bearing part 11 injection-molded directly on the cover 6. The plain bearing part 11 has both a cylindrical radial bearing part 11b for receiving radial loads from the drive shaft 9, and a discoidal thrust bearing part 11a for receiving thrust loads. The thrust bearing part 11a is provided in the form of a collar to the outside-diameter side on the end of the radial bearing part 11b. The thrust bearing part 11a has a through-hole in the middle for the drive shaft 9. As shown in FIG. 2, the drive shaft 9 has different-leveled sections, including a body part and a distal end part smaller in diameter than the body part, the distal end part being fixed to the inner rotor 3. The plain bearing part 11 supports the step face of the drive shaft 9 with the supporting face of the thrust bearing part 11a, and supports the outside-diameter face of the distal end part of the drive shaft 9 with the supporting face of the radial bearing part 11b. The thrust bearing part 11a in FIG. 2 is shaped to support the entire step face of the drive shaft, but no limitation is provided thereby; the thrust bearing part 11a may be shaped to support part of the step face.

FIGS. 3 to 6 show another example of the plain bearing. FIGS. 3 to 6 are axial sectional views showing only the cover. The cover 6 shown in FIG. 3 has only the cylindrical radial bearing part 11b for receiving radial loads from the drive shaft, and does not have a thrust bearing part. In the case of a pump in which thrust loads of the drive shaft do not need to be supported, or a structure in which thrust loads are received by a portion other than the bearing, or in cases in which light thrust loads can be directly received by the cover member, a plain bearing with this type of configuration can be used.

Figure 4:
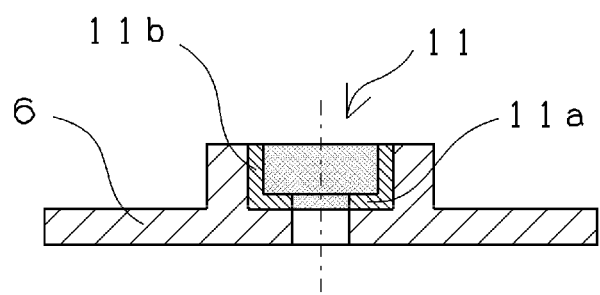
FIG. 4 shows another example of a cover in which a radial bearing part and a thrust bearing part are formed.

The cover 6 shown in FIG. 4 has both the cylindrical radial bearing part 11b for receiving radial loads from the drive shaft and the discoidal thrust bearing part 11a for receiving thrust loads, the thrust bearing part 11a being positioned on the inside-diameter side of the radial bearing part 11b. Additionally, the thrust bearing part 11a is provided to the bottom end part (the trochoid side) of the radial bearing part 11b.

Figure 5:
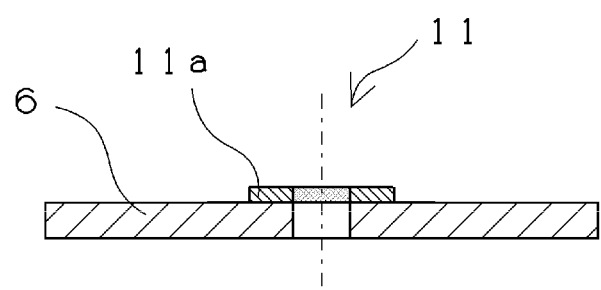
FIG. 5 shows an example of a cover in which a thrust bearing part is formed.
Figure 6:
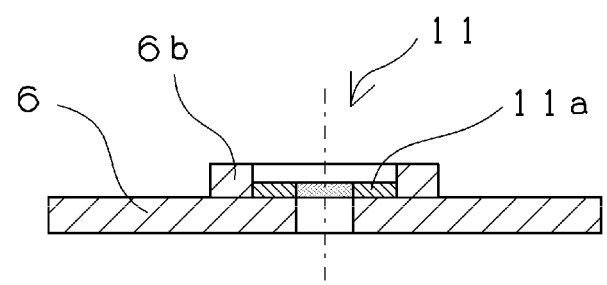
FIG. 6 shows another example of a cover in which a thrust bearing part is formed.

The cover 6 shown in FIGS. 5 and 6 has only the discoidal thrust bearing part 11a for receiving thrust loads from the drive shaft, and does not have a radial bearing part. In the case of a pump in which radial loads of the drive shaft do not need to be supported, or a structure in which radial loads are received by a portion other than the bearing, a plain bearing with this type of configuration can be used. In FIG. 6, the entire outer periphery of the thrust bearing part 11a has a protruding part 6b which protrudes past the thrust bearing face. Providing the protruding part 6b allows the thrust bearing face to slide through reservoir of oil being pumped, friction is therefore low, and the seizing property when oil runs out can be improved.

Because the plain bearing is formed by injection-molding, hydrodynamic pressure grooves, lubrication grooves, and concave or convex dimples can be easily formed in the surface thereof. It is possible to achieve a product design having a high degree of freedom because the necessary surface shape and pattern is formed by mold transfer during the injection-molding. The depths and widths of the grooves or the like can be easily changed depending on the positions thereof. Forming dynamic pressure grooves and lubrication grooves by machining has poor productivity and high costs, and is not pragmatic. The shapes and positions of the hydrodynamic pressure grooves, lubrication grooves, and concave or convex dimples are not particularly limited. Providing hydrodynamic pressure grooves while lubrication is provided by oil, water, chemicals, or the like can create dynamic pressure and lower the friction coefficient. Additionally, lubrication grooves and concave or convex dimples can provide fluid lubrication, reduce frictional shearing force, lower friction, and lower abrasion. Hydrodynamic pressure grooves, lubrication grooves, and concave or convex dimples would also fulfill the role of an oil reservoir, and the seizing property when oil runs out could therefore be improved.

Figure 7:
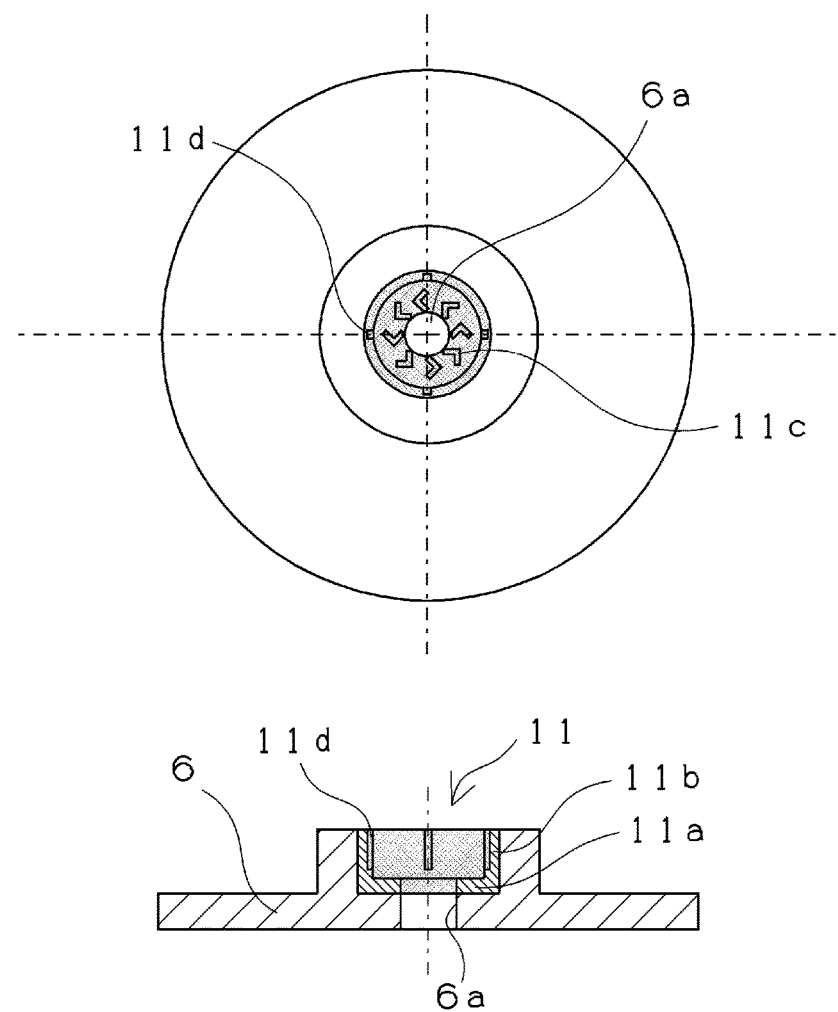
FIG. 7 shows an example of a cover having a plain bearing part in which lubrication grooves are formed.

FIG. 7 shows an example of a plain bearing in which lubrication grooves are formed. FIG. 7 includes a plan view (the top) and an axial sectional view (the bottom) showing only the cover. The cover 6 shown in FIG. 7, having the same shape as in FIG. 4, has both a cylindrical radial bearing part 11b for receiving radial loads from the drive shaft, and a discoidal thrust bearing part 11a for receiving thrust loads, the thrust bearing part 11a being positioned on the inside-diameter side of the radial bearing part 11b. In this cover 6, lubrication grooves 11c, 11d are formed in the surfaces (the drive-shaft-supporting faces) of the thrust bearing part 11a and the radial bearing part 11b, respectively.

The lubrication grooves 11d of the radial bearing part 11b are linear recesses extending in the axial direction, and four of these grooves are provided at equal intervals (90° intervals) in the circumferential direction. The lubrication grooves 11d are not through-holes and are not continuous with the lubrication grooves 11c of the thrust bearing part 11a, and these grooves therefore fulfill the role of an oil reservoir. The lubrication grooves 11c of the thrust bearing part 11a communicate with a through-hole 6a in the drive shaft of the cover 6. The lubrication grooves 11c are each formed into L shapes, communicated at one end with the through-hole 6a, and arranged concentrically around the through-hole 6a. The shapes of the lubrication grooves 11c are not limited to those illustrated in FIG. 7. When oil or the like is pumped to the trochoid, oil leaks through the gap between the drive shaft and the cover through-hole. This oil is held in the lubrication grooves 11c and the frictional torque caused by thrust loads is reduced. Furthermore, concave dimples can be provided in the surface of the thrust bearing part 11a to provide an oil reservoir.

Figure 8:
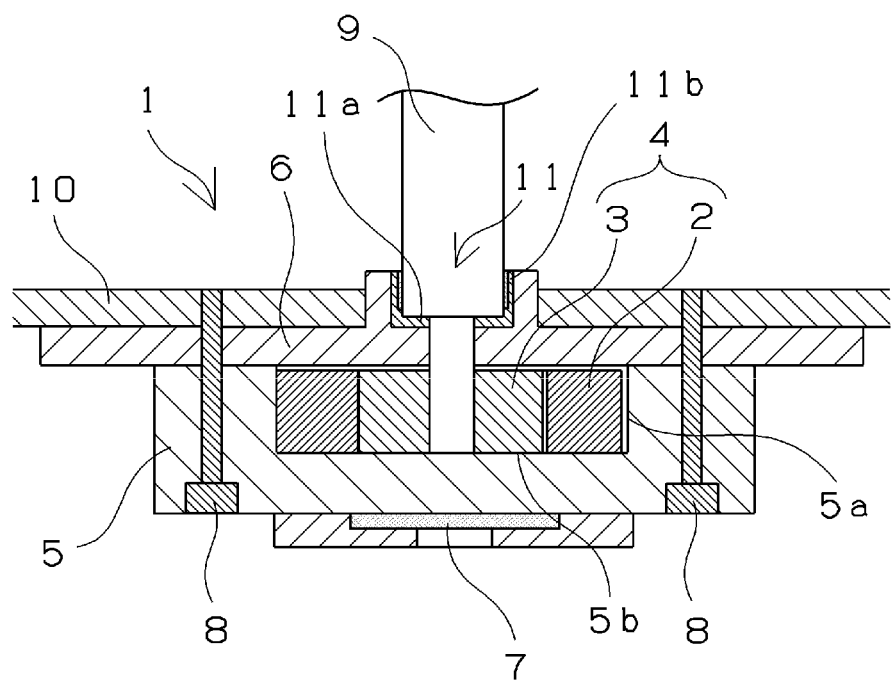
FIG. 8 is an axial sectional view of an internal gear pump that uses the cover from FIG. 7.

FIG. 8 shows an axial sectional view of an internal gear pump using the cover of FIG. 7. Aside from the configuration of the cover 6, the configuration is the same as that shown in FIG. 2. This internal gear pump 1 has a smaller radius of rotation and less frictional torque because the thrust bearing part 11a is provided on the inside-diameter side of the radial bearing part 11b. Furthermore, because of these lubrication grooves, the oil leaking through the gap between the drive shaft 9 and the through-hole of the cover 6 can be effectively utilized to create an excellent state of lubrication, and the plain bearing part also provides a sealing effect (leakage out of the bearing part is suppressed). Therefore, seizing resistance is increased in a stable manner, and the internal gear pump has greater longevity.

Figure 9:
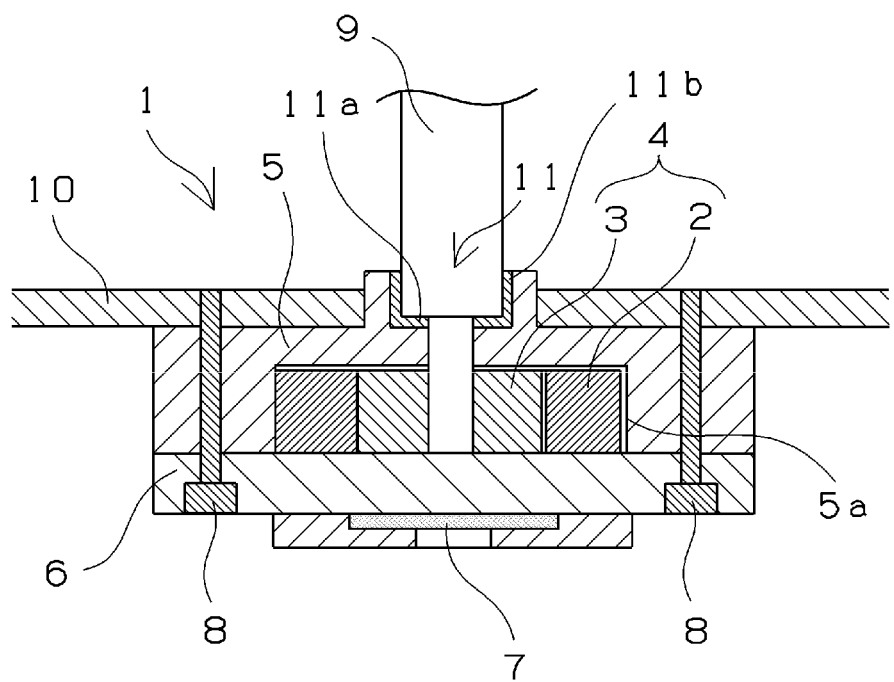
FIG. 9 is an axial sectional view showing another example of the internal gear pump of the present invention.
Figure 10:
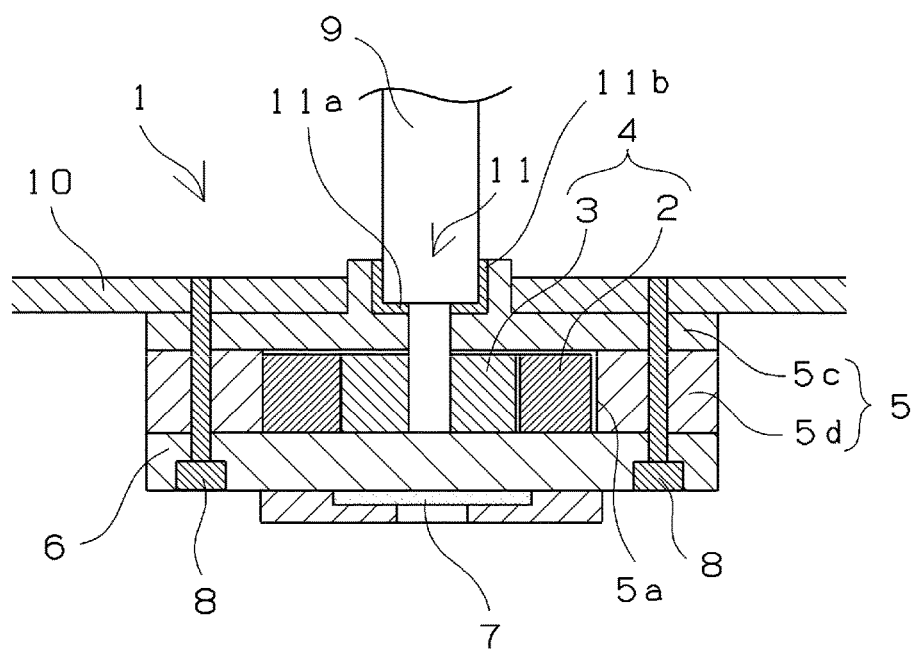
FIG. 10 is an axial sectional view showing another example of the internal gear pump of the present invention.
Figure 11:
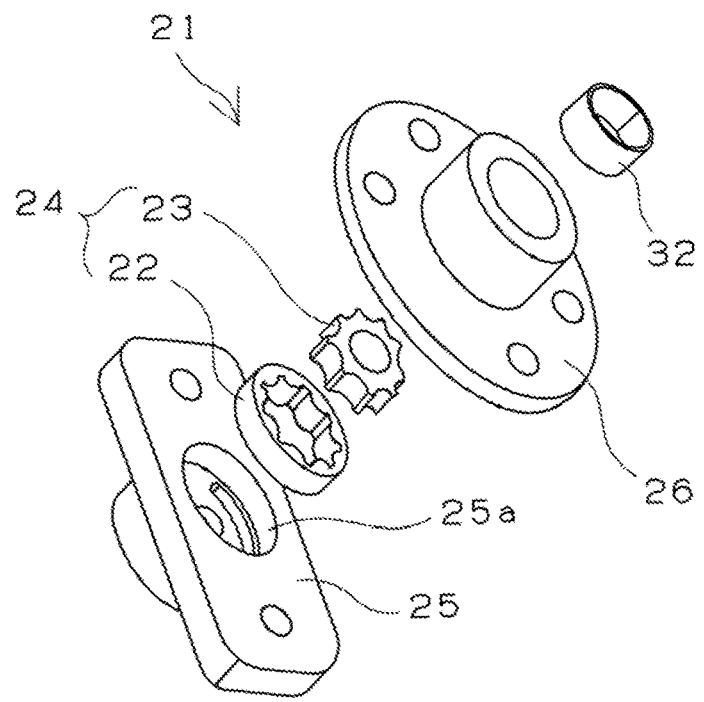
FIG. 11 is an exploded view of a conventional internal gear pump.
Figure 12:
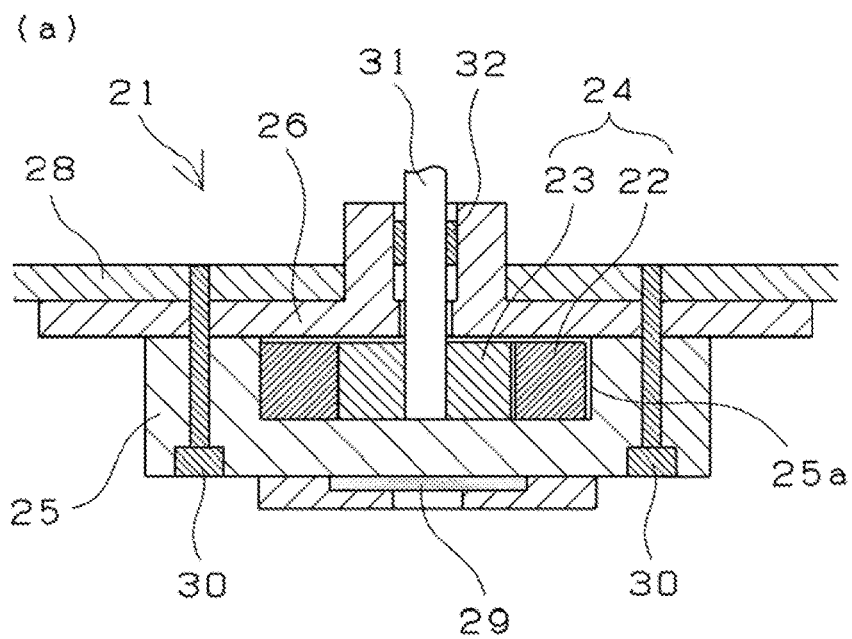
FIG. 12 is an axial sectional view of a conventional internal gear pump.
Figure 12:
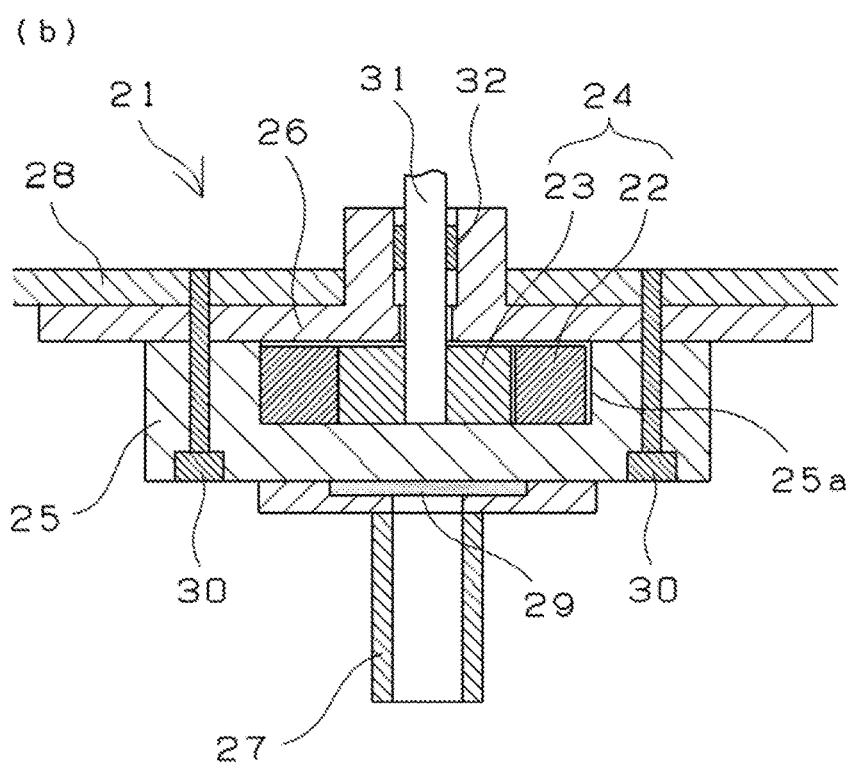

FIGS. 9 and 10 show examples of the plain bearing part formed in the casing. FIGS. 9 and 10 are axial sectional views of the internal gear pump. This internal gear pump 1 has the plain bearing part 11 formed in the casing 5, as shown in FIG. 9. The casing 5 has both a cylindrical radial bearing part 11b for receiving radial loads from the drive shaft 9, and a discoidal thrust bearing part 11a for receiving thrust loads, the thrust bearing part 11a being positioned on the inside-diameter side of the radial bearing part 11b. The same configuration of the plain bearing part shown in FIGS. 3 to 7 can be used in this case as well, and the same effect can be achieved as when the plain bearing part is formed in the cover side. The configuration in FIG. 10 is similar to that of FIG. 9, with the casing 5 being a composite article of a sintered member 5c and a resin member 5d, and the plain bearing part 11 being formed in the sintered member 5c.

The thermoplastic resin composition that forms the plain bearing part has an injection-moldable synthetic resin as a base resin. Examples of this base resin include thermoplastic polyimide (abbreviated as PI below) resin, polyether ketone resin, PEEK resin, polyphenylene sulfide (abbreviated as PPS below) resin, polyamide imide (abbreviated as PAI below) resin, polyamide resin (abbreviated as PA below), etc. These resins may be used individually or may be polymer alloy mixtures of two or more types.

PPS resin is a crystalline thermoplastic resin that has a polymer structure in which benzene rings are linked at the para-position by sulfur bonds. PPS resin has extremely high rigidity and superior heat resistance, dimensional stability, abrasion resistance, as well as sliding characteristics and the like. As dictated by the molecular structure, PPS resin comes in cross-linked, semi-crosslinked, linear, branched, and other varieties, but commercial PPS resins that can be used in the present invention include #160 and B-063, manufactured by Tosoh Corp., and T4AG and LR-2G, manufactured by DIC Corp.

PEEK resin is a crystalline thermoplastic resin having a polymer structure in which benzene rings are linked at the para-position by ether bonds with carbonyl groups. PEEK resin has excellent heat resistance, creep resistance, load resistance, abrasion resistance, and sliding characteristics, while also having superior molding properties. Examples of commercially marketed PEEK resins that can be used in the present invention include PEEK (e.g., 90P, 150P, 380P, 450P) manufactured by Victrex, KetaSpire (e.g., KT-820P, KT-880P) manufactured by Solvay Advanced Polymers, and VESTAKEEP (e.g., 1000G, 2000G, 3000G, 4000G) manufactured by Daicel-Degussa.

Examples of PA resins that can be used in the present invention include polyamide 6 (PA6) resin, polyamide 6-6 (PA66) resin, polyamide 6-10 (PA610) resin, polyamide 6-12 (PA612) resin, polyamide 4-6 (PA46) resin, polyamide 9-T (PA9T) resin, modified PA9T resin, polyamide 6-T (PA6T) resin, modified PA6T resin, and polymetaxylylene adipamide (polyamide MXD-6) resin. The number of carbons between amide bonds is denoted by the numerals in the polyamide resins, and T denotes a terephthalic acid residue.

Examples of commercially marketed thermoplastic PI resins that can be used in the present invention include *Aurum* resins, manufactured by Mitsui Chemicals, and examples of commercially marketed PAI resins include thoron, manufactured by Solvay Specialty Polymers.

In the plain bearing part of the internal gear pump of the present invention, it is preferable to use a base resin that is resistant to the oil, water, chemicals, or other liquid being pumped, and that undergoes little dimensional change due to absorbing water or oil. A resin that resists heat at 150° C. or greater is preferably used in a scroll compressor. Among the resins described above, PEEK resin and PPS resin are preferred as such a resin having excellent chemical resistance, heat resistance, dimensional stability, and abrasion resistance. Between these, it is particularly preferable to use PEEK resin for its excellent creep resistance, load resistance, abrasion resistance, and other characteristics as a molded article.

It is preferable to blend blending agents in the thermoplastic resin composition forming the plain bearing part. Examples of materials that can be blended include reinforcing agents such as glass fiber, carbon fiber, whiskers, mica, talc, and the like that are added in order to increase strength, increase elasticity, and increase dimensional precision; inorganic fillers (in the form of powders or particles) such as minerals, calcium carbonate, glass beads, and the like that are added in order to provide abrasion resistance or eliminate anisotropy resulting from injection-molding shrinkage; and solid lubricants such as graphite, PTFE resin, and the like that are added in order to provide lubricating properties.

It is preferable to use glass fiber, carbon fiber, or inorganic fillers, individually or in suitable combinations, these materials being effective in increasing strength, improving elasticity, raising dimensional precision, and providing abrasion resistance. In particular, carbon fiber is useful for increasing strength, improving elasticity, and raising dimensional precision, and carbon fiber has excellent friction abrasion characteristics when lubricated by the oil, water, chemical, or the like being pumped.

The state of lubrication provided by the oil, water, chemical, or the like being pumped is sometimes poor, and solid lubricants such as graphite, PTFE resin, and the like are therefore preferably blended in. PTFE resin, which reduces friction and can prevent seizing, is particularly preferred when the sliding surfaces are poorly lubricated, such as in cases of air conditioners or the like in which the compressor is restarted after a certain time period.

In the present invention, it is preferable to use a thermoplastic resin composition that has a PEEK resin as a base resin, as well as a PTFE resin blended therein with carbon fiber. The resin composition preferably has a blend ratio which is 5 to 30 vol % carbon fiber, 1 to 30 vol % PTFE resin, and the remainder PEEK resin. This configuration yields a plain bearing part that has excellent oil resistance and chemical resistance, and the compressor and other components have excellent friction abrasion characteristics even when used in a high-temperature atmosphere exceeding 120° C., as well as being unlikely to seize up even when poorly lubricated.

The carbon fibers may be pitch or PAN carbon fibers sorted from a starting material, but PAN carbon fibers, which have a high modulus of elasticity, are preferred. The baking temperature is not particularly limited, but a carbonized product baked at about 1000 to 1500° C. is preferred over a product baked at a high temperature of 2000° C. or higher to produce a graphitized (black lead) product, because the metal drive shaft, which is a counterpart material, is not likely to be abrasively damaged even under high PV. The average fiber diameter of the carbon fibers is 20 μm or less, and preferably 5 to 15 μm. Extreme pressure is generated when thick carbon fibers exceeding this range are used and such carbon fibers are therefore not preferred in that the effect of improving load resistance is poor and abrasive damage to the drive shaft is increased.

The carbon fibers may be either chopped fibers or milled fibers, but when the plain bearing part is molded thinly, milled fibers having a fiber length of less than 1 mm are preferred. The average fiber length of the carbon fibers is preferably 0.02 to 0.2 mm. When the average fiber length is less than 0.02 mm, sufficient reinforcement effect cannot be obtained, and creep resistance and abrasion resistance are degraded. When the average fiber length exceeds 0.2 mm, the thin moldability is degraded because the ratio of fiber length to resin thickness is increased. In the particular case of insertion molding to a resin thickness of about 0.1 to 0.7 mm, thin moldability is inhibited when the fiber length exceeds 0.2 mm. The average fiber length is preferably 0.02 to 0.2 mm in order to further enhance stability of thin molding.

Commercially available examples of the carbon fibers that may be used in the present invention include pitch carbon fibers such as KRECA Milled (M101AS, M101F, M101T, M107S, M1007S, M201S, M207S) manufactured by Kureha Corp, and DONACARBO Milled (S241, S244, SG241, SG244) manufactured by Osaka Gas Chemicals Co., Ltd. Examples of the PAN carbon fibers include Tenax HTA-CMF0160-0H and CMF0070-0H manufactured by Toho Tenax.

A common PTFE resin represented by $-(CF_2-CF_2)n-$ can be used as the PTFE resin, or a denatured PTFE resin, resulting from introducing, e.g., a perfluoroalkyl ether group ($-C_pF_{2p}-O-$) (p being an integer of 1 to 4) or a polyfluoroalkyl group ($H(CF_2)_q-$) (q being an integer of 1 to 20) into a common PTFE resin, can also be used. These PTFE resins and denatured PTFE resins may be obtained using either a suspension polymerization method for obtaining a common molding powder, or an emulsion polymerization method for obtaining a fine powder.

The average particle diameter (a value measured by laser analysis) of the PTFE resin powder is not particularly limited, but is preferably 20 μm or less for stable, low-friction characteristics and abrasion resistance. A PTFE resin baked by heating at the melting point thereof or a higher temperature can be used as the PTFE resin powder. A powder irradiated with, e.g., a γ-ray or an electron beam can also be used as the powder heated by baking. These PTFE resin powders have excellent abrasion resistance characteristics in comparison with PTFE resins (molding powders, fine powders) not heated by baking or otherwise treated.

Examples of commercially available PTFE resins that can be used in the present invention include: KTL-610, KTL-350, KTL-450, KTL-8N, KTL-8F, and KTL-400H manufactured by Kitamura, Ltd.; Teflon (registered trademark) 7-J manufactured by Du Pont-Mitsui Fluorochemicals Co., Ltd.; Fluon G163, L169J, L170J, and L173J manufactured by Asahi Glass Co., Ltd.; Polyflon M-15 and Lubron L-5 manufactured by Daikin Industries, Ltd.; and Hostaflon TF9205 and TF9207 manufactured by Hoechst AG.

Well-known additives for resins may be added to the thermoplastic resin composition in amounts that do not inhibit the effects of the present invention. Examples of these additives include: friction characteristics improvers such as boron nitride; colorants such as carbon powder, iron oxide, and titanium oxide; and thermal conductivity improvers such as graphite and metallic oxide powders.

There are no particular restrictions on the means for mixing and kneading the various raw materials described above. Molding pellets (granules) can be obtained by dry-mixing powdered raw materials in, e.g., a Henschel mixer, ball mixer, ribbon blender, Lodige mixer, or ultra-Henschel mixer, and also melt-kneading using a twin-screw extruder or other melt extruder. In addition, introduction of the filler may be carried out by side-feeding during melt-kneading using, e.g., a twin-screw extruder. The members forming the plain bearing part (the cover and/or the casing) are put into a mold and injection-molded (insert-molded) using the molding pellets, and the plain bearing part is molded. A treatment such as annealing may be carried out after the molding in order to improve characteristics.

The gate scheme (pin gate, disk gate, and the like) and gate position during injection-molding are not particularly limited, but when carbon fibers or the like are included, the gate is preferably provided to a position where the length direction of the carbon fibers can be oriented so as to intersect the rotational direction of the plain bearing part at 45 to 90 degrees (preferably 80 to 90 degrees). Abrasive damage to the drive shaft caused by both edges of the carbon fibers or the like can thereby be reduced, and the friction coefficient can be stabilized.

The substance of the cover may be either ingot metal or sintered metal. A preferred ingot metal would be cast iron or die cast, which have little material loss during machining of the raw material, cast iron being more preferred in terms of strength and value. When the thermoplastic resin composition is injection-molded directly onto a cover made of ingot metal to form the plain bearing part, it is preferable to form physical concavo-convex retaining shapes by machining, or to carry out a chemical surface treatment, in order to increase close adhesion with the resin. Examples of chemical surface treatments include: (1) treatment of forming very small concavo-convex shapes in the surface-bonding face by using an acid solution treatment, an alkali solution treatment, or by mixing in another solution; and (2) treatment (e.g. Toadenka Corporation TRI treatment) of forming a bonding film that chemically reacts with the resin layer on the bonding face.

An iron-based metal is preferred as the sintered metal in terms of strength and value. An ingot metal is more preferred because the surface of a sintered metal has concavities and convexities and close adhesion with the resin would increase even without a pretreatment. The sintered metal used in the present invention is preferably one in which the density of the sintered metal is a theoretical density ratio of material of 0.7 to 0.9. The theoretical density ratio of material is the ratio of the density of the sintered metal base material where 1 is the theoretical density of the material (the density when porosity is 0%). When the theoretical density ratio is less than 0.7, the strength of the sintered metal is low, and the sintered metal is liable to fracture under the pressure of injection-molding during insert molding. When the theoretical density ratio exceeds 0.9, the concavities and convexities become smaller, the surface area and anchoring effect are therefore reduced, and close adhesion with the resin layer is reduced. Steam treating a sintered metal having iron as a main component has the effect of removing oil, deposits, and the like unintentionally deposited on or permeated into the sintered surface during the molding or recompression (sizing) step, and variability in close adhesion with the resin can therefore be reduced and stabilized. Rust resistance can also be imparted to the sintered metal base material.

The material of the casing is not particularly limited, and the same material as the cover can be used. Cast iron, aluminum casting, and die-cast aluminum are preferred because there is little material loss during machining of the raw material, and processing costs are low. The casing material may also be an injection-molded article of a resin composition.

The cover and the casing may also be a composition of a metal article (e.g., a sintered metal article) and a resin molded article. In this case, placing a sintered metal article in the area where the plain bearing part is formed causes adhesive force with the injection-molded resin composition to increase due to the anchoring effect of the concavities and convexities in the sintered metal surface, and problems such as peeling of the plain bearing part can be prevented (see FIG. 10).

The material of the outer rotor and the inner rotor is a sintered metal, and may be an iron, copper/iron, copper, stainless steel, or other system. Hard iron is preferred because of the value thereof and abrasion resistance. Stainless steel or the like, which has high rust-preventative capability, may be used in a trochoid pump for pumping chemicals or the like.

The thickness of the plain bearing part formed by injection-molding the thermoplastic resin composition is preferably in a range of 0.1 to 0.7 mm. This range is also preferred for both the thrust bearing part and the radial bearing part, and these two parts may be equal or different in thickness. These parts may be formed thickly during injection-molding or may be finished by machining afterwards. When the thickness exceeds 0.7 mm, friction-induced heat has difficulty escaping from the friction surface to the side of, e.g., the cover, and the friction surface temperature is liable to increase. The amount of load-induced deformation is also greater, and the true contact surface area on the friction surface is liable to increase, frictional force and friction-induced heat are liable to be higher, and the seizing property is liable to suffer. When the thickness is less than 0.1 mm, the service life during long-term usage is liable to be shorter.

The internal gear pump of the present invention is cost-effective in that the plain bearing part can be formed without machining the inside-diameter part of the member forming the plain bearing part, because the plain bearing part comprises a thermoplastic resin composition formed by injection-molding directly on, e.g., the cover. Because the plain bearing part is configured from a single material, the material of the sliding surface does not change during use even after the inside diameter processing of the bearing part, and a stable seizing property is therefore achieved. Furthermore, frictional torque and bearing abrasion can be reduced by providing lubrication grooves, fluid lubrication grooves, and the like to the friction surface.

INDUSTRIAL APPLICABILITY

The internal gear pump of the present invention requires fewer machining steps, enables manufacturing to be inexpensively performed, and offers high bearing functionality, and accordingly can be used as a bearing-integrated internal gear pump (trochoid pump) for pumping liquids such as oil, water, and chemicals. The invention is particularly well suited for use as a pump for supplying liquids to the sliding parts of scroll-type compressors used in electric water heaters, home air conditioners, and car air conditioners which employ, e.g., a chlorofluorocarbon substitute or carbon dioxide gas as a refrigerant.

EXPLANATION OF NUMERALS AND CHARACTERS

1 Internal gear pump
2 Outer rotor
3 Inner rotor
4 Trochoid
5 Casing
6 Cover
7 Metallic filter
8 Fixing bolt
9 Drive shaft
10 Device body fixing plate
11 Plain bearing part

The invention claimed is:
1. An internal gear pump comprising a trochoid in which an inner rotor having a plurality of outer teeth is eccentrically and rotatably accommodated in an outer rotor having a plurality of inner teeth, the outer teeth meshing with the inner teeth, and in which a suction-side chamber for suctioning liquid and a discharge-side chamber for discharging the liquid suctioned into the suction-side chamber are formed between the inner teeth and the outer teeth;

said internal gear pump being characterized by comprising a drive shaft fixed to the inner rotor, a casing in which a recess for accommodating the trochoid is formed, and a cover for closing off the recess of the casing, wherein one or both members are selected from the cover and the casing having a plain bearing part for rotatably supporting the drive shaft, and the plain bearing part being formed on said one or both members by injection-molding a thermoplastic resin composition, wherein the plain bearing part has a radial bearing part and a thrust bearing part, said thrust bearing part being positioned on an inside-diameter side of the radial bearing part.

2. The internal gear pump according to claim 1, characterized in that in the one or both members having the plain bearing part, an area where the plain bearing part is formed is a sintered metal body.

3. The internal gear pump according to claim 1, characterized in that a drive-shaft thrust-supporting face of the thrust bearing part has lubrication grooves that communicate with a through-hole for the drive shaft in said drive-shaft thrust-supporting face.

4. The internal gear pump according to claim 1, characterized in that the thermoplastic resin composition is made by blending carbon fibers and a polytetrafluoroethylene resin into a polyether ether ketone resin.

* * * * *